(12) United States Patent
De Vos et al.

(10) Patent No.: US 8,308,535 B2
(45) Date of Patent: Nov. 13, 2012

(54) METHOD AND DEVICE FOR PROCESSING PART OF A SLAUGHTERED POULTRY CARCASS

(75) Inventors: Ferdinand Allard De Vos, Ma Oostzaan (NL); Hendrik Jan Jonkers, Ma Oostzaan (NL); Hermanus Laurentius Zomerdijk, Ma Oostzaan (NL); Michael George Lourentius Koopman, Ma Oostzaan (NL); Pieter Willem Vonk, Ma Oostzaan (NL); Willem Cornelis Steenbergen, Ma Oostzaan (NL)

(73) Assignee: Meyn Food Processing Technology B.V., Oostzaan (NL)

( * ) Notice: Subject to any disclaimer, the term of this patent is extended or adjusted under 35 U.S.C. 154(b) by 0 days.

(21) Appl. No.: 13/434,121

(22) Filed: Mar. 29, 2012

(65) Prior Publication Data

US 2012/0252337 A1    Oct. 4, 2012

Related U.S. Application Data

(62) Division of application No. 12/862,064, filed on Aug. 24, 2010.

(30) Foreign Application Priority Data

Aug. 24, 2009  (NL) ..................... 2003384

(51) Int. Cl.
*A22C 17/00* (2006.01)
(52) U.S. Cl. ........................................................ 452/136
(58) Field of Classification Search .................. 452/135, 452/136, 149–153, 156, 157, 166, 167
See application file for complete search history.

(56) References Cited

U.S. PATENT DOCUMENTS

| | | | | |
|---|---|---|---|---|
| 3,811,152 | A * | 5/1974 | Herubel | 452/136 |
| 5,314,374 | A * | 5/1994 | Koch et al. | 452/136 |
| 6,598,298 | B1 * | 7/2003 | Bartlett | 30/143 |
| 7,344,437 | B2 * | 3/2008 | Van Den Nieuwelaar et al. | 452/187 |
| 7,357,707 | B2 * | 4/2008 | de Vos et al. | 452/136 |
| 7,367,878 | B2 * | 5/2008 | Jensen et al. | 452/135 |
| 8,231,444 | B2 * | 7/2012 | De Vos et al. | 452/136 |

* cited by examiner

*Primary Examiner* — Richard Price, Jr.
(74) *Attorney, Agent, or Firm* — Dority & Manning, P.A.

(57) ABSTRACT

A device for processing a carcass part of slaughtered poultry in a processing line is provided. The carcass part is supported on a carrier that moves in the processing line. The device includes device for cutting and/or removing of the wishbone from the carcass part. The device is arranged such that the device for cutting and/or removing of the wishbone can be a knife equipped to cut the wishbone and disconnect it from the membrane and/or ligament with an increased yield of meat that is retained on the carcass part.

5 Claims, 5 Drawing Sheets

METHOD AND DEVICE FOR PROCESSING PART OF A SLAUGHTERED POULTRY CARCASS

PRIORITY CLAIM

This application is a divisional application of and claims priority to U.S. patent application Ser. No. 12/862,064 filed on Aug. 24, 2010, which is incorporated herein by reference for all purposes.

FIELD OF THE INVENTION

The invention relates to a method and device for processing part of a slaughtered poultry carcass in a processing line. The carcass part is supported on a carrier that is movable in the processing line. The carcass part includes wing-joints, coracoids, a wishbone embodied with two legs that merge into each other at an acute angle, a keelbone, at least one membrana and/or ligament that connects to the wishbone and the remainder of the carcass part, and naturally present meat including inner and outer fillets. The device includes means for cutting and/or removing the wishbone from the carcass part. Such means includes an arrow-shaped knife that initially detaches a first membrana that connects the wishbone to the remainder of the carcass. Such means also includes two blades arranged on opposite sides of the knife, with the two blades being independently movable with respect to the knife and arranged with forward edges for cutting the membrane and/or ligament that connects the wishbone to the keelbone.

BACKGROUND OF THE INVENTION

A carcass processing device is disclosed in EP-B-1,430,780. In such known device, a first straight wishbone blade is introduced into the carcass part via a neck opening. This first wishbone blade has a cutting edge with a contour that substantially corresponds to the outer contour of the complete wishbone. As the cutting edge is introduced, it cuts loose the side of the wishbone which faces the backside of the carcass part. The first wishbone blade is substantially in the shape of an arrow. Furthermore, there are two second wishbone blades that are substantially perpendicular to the first wishbone blade and follow the outer contour of the wishbone and cut the wishbone of the carcass part. To remove the wishbone from the carcass part, the first wishbone blade and the two second wishbone blades are together pulled back out of the carcass part with a block, while the wishbone remains enclosed between the block, the first wishbone blade, and the two second wishbone blades.

The known device as disclosed in EP-B-1,430,780 is disadvantageous in several respects, notably:
- the first wishbone blade leaves part of the legs of the wishbone attached to the wing-joints, and usually also cuts part of the wishbone at the position where the legs of the wishbone merge into each other. This results frequently in bone splinters remaining in the meat of the slaughtered poultry which deteriorates its commercial value;
- the parts of the legs of the wishbone that remain attached to the wing-joints causes meat to remain connected to these parts that is not available for harvesting;
- the first wishbone blade may occasionally damage the fillets of the carcass part;
- removal of the wishbone from the carcass part is occasionally cumbersome or even impossible without damaging the wishbone during its removal due to the tough structure of one of the membranas and/or ligaments that connects to the wishbone. Valuable meat may also remain attached to the removed wishbone.

SUMMARY OF THE INVENTION

Objects and advantages of the invention will be set forth in part in the following description, or may be obvious from the description, or may be learned through practice of the invention. The apparatus and method of the invention are characterized by one or more of the appended claims.

In one aspect, the present invention provides a device having means for cutting and/or removing of the wishbone that is arranged to cut the wishbone and disconnect it from the at least one attaching membrane and/or ligament with an increased yield of meat that is retained on the carcass part.

In one exemplary embodiment, the device is configured with forward cutting edges of two blades that are arranged on opposite sides of a knife and are provided with forwardly projecting teeth. This tremendously improves the ease at which the two blades can cut through any membrane and/or ligament that otherwise connects to the wishbone and avoids having valuable meat remain attached to the wishbone during its removal. In an exemplary aspect, the teeth of the two blades are arranged on opposite sides of the knife and intermesh with the blades are in a position where there cutting edges contact each other. This greatly improves the effectiveness of the two cutting blades.

In one exemplary embodiment, the knife is arranged with cutting side-edges, and is further provided with an S-shaped contour to arrange that when same is introduced between the legs of the wishbone up to a position wherein the arrow's point of the knife approaches the part where the legs of the wishbone merge into each other, the cutting side-edges of the knife are arranged to cut the legs of the wishbone at a position immediately adjacent to the wing-joints to which the wishbone connects. This avoids leaving part of the legs of the wishbone attached to the wing-joints, and also avoids cutting part of the wishbone at the position where its legs merge into each other. As a consequence, bone splinters are avoided and the yield of meat that remains on the carcass-part is improved. Furthermore, due to the S-shaped contour of the knife, damage to the fillets on the carcass part is also effectively prevented.

These blades can further act as an anvil for the knife, when the knife is operated for cutting the legs of the wishbone.

Another aspect of the invention relates to the usually present positioning unit for the wing-joints. In accordance with this aspect, the positioning unit is arranged as a plate with receptacles for receiving therein the coracoids of the carcass part while supporting the coracoids. This proves to be a very effective means of positioning the wing-joints that is beneficial for the process of removing the wishbone without leaving bone splinters in the meat on the carcass part, and without undesirably removing meat together with the wishbone from the carcass part.

In order to promote its proper functioning without compromising the versatility of the device of the invention, the plate is preferably movable to and from the path that the carcass part follows in the processing line.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Wherever in the figures of the drawing the same reference numerals are applied these numerals refer to the same parts.

DETAILED DESCRIPTION

Figure 1:
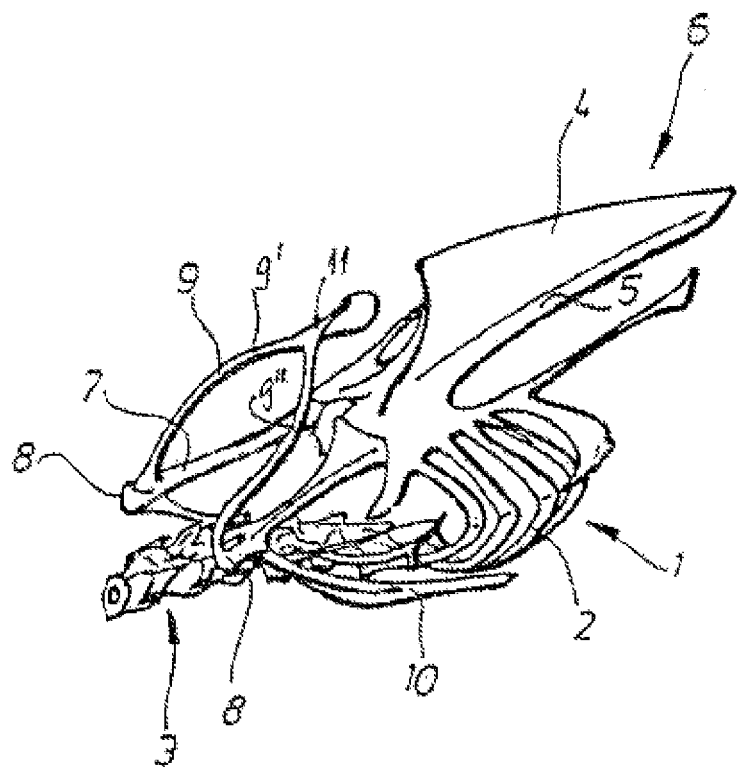
FIG. 1 illustrates the bones of a carcass part of a slaughtered poultry.

For purposes of describing the invention, reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment, can be used with another embodiment to yield a still further embodiment. Thus, it is intended that the present invention covers such modifications and variations as come within the scope of the appended claims and their equivalents.

Taking first reference to FIG. 1, the bone structure of a carcass part 1 is shown. Apart from the meat (not shown) that naturally is present, the carcass part 1 has ribs 2 connected to the vertebral column 3 At the breast side the carcass part 1 is provided with the breastbone crest 4 and the breastbone plate 5. Together they are referred to as the breastbone or keelbone 6. FIG. 1 further shows that the carcass part 1 is provided with the shoulder blade or scapula 10, and that there are wing-joints 8 on one side connected to the coracoids 7, and at the other side connected to the wishbone 9 having legs 9' and 9" that merge into each other at the point provided with reference 11.

The device of the invention is arranged for processing a carcass part 1 of slaughtered poultry in a processing line, whereby the carcass part 1 is supported on a carrier that moves in the processing line. Such a processing line arrangement is known in the art and thus, a detailed description of such arrangement need not be provided herein. A person of ordinary skill in the art is knowledgeable with the arrangement of carriers that move in a processing line for the purpose of processing carcass parts that are supported by such carriers through the processing line. While being transported along the processing line, the carcass parts are being processed by devices arranged in or next to the processing line.

Figure 2:
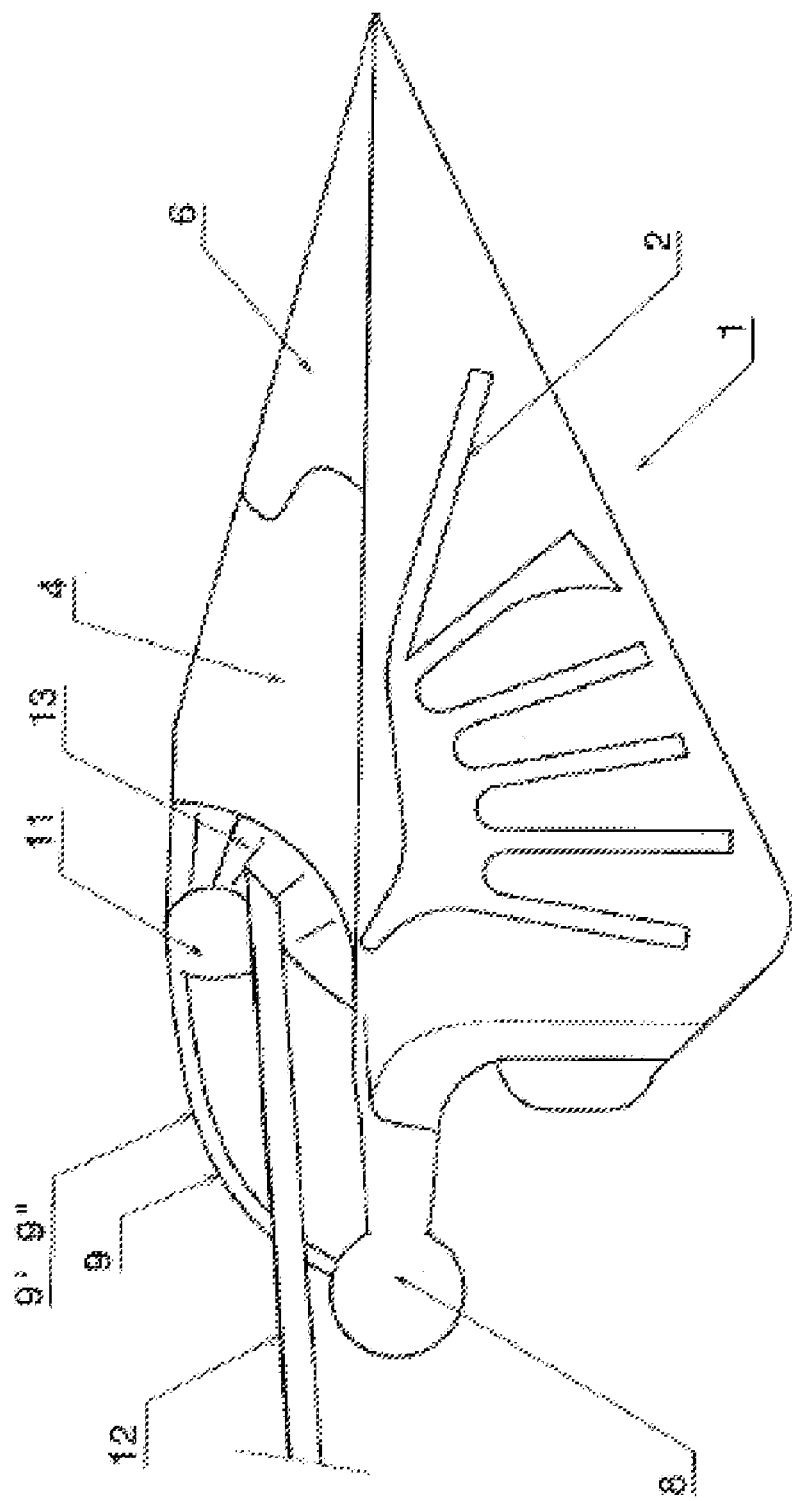
FIG. 2 illustrates schematically the operation of an exemplary device for processing the carcass part of a slaughtered poultry in accordance with the prior art.

FIG. 2 shows part of a device according to the prior art, which has cutting means 12 in the form of an arrow shaped as a straight blade that is used for cutting the legs 9', 9" of the wishbone 9. As the figure clearly shows, when the cutting means 12 is operated then the legs 9', 9" of the wishbone 9 are cut at some distance from the wing-joints 8. Furthermore, the part 11 at which the legs 9', 9" merge into each other, is also cut by the blade 12. Both effects give rise to the possibility that bone splinters may remain in the meat of the carcass part 1, and that unintentionally meat will connect to the parts of the wishbone 9 that remain attached to the wing-joints 8 and such parts will hinder the harvesting of meat. The prior art device also gives rise to damage to the fillets that are supported by the carcass part 1.

Figure 3:
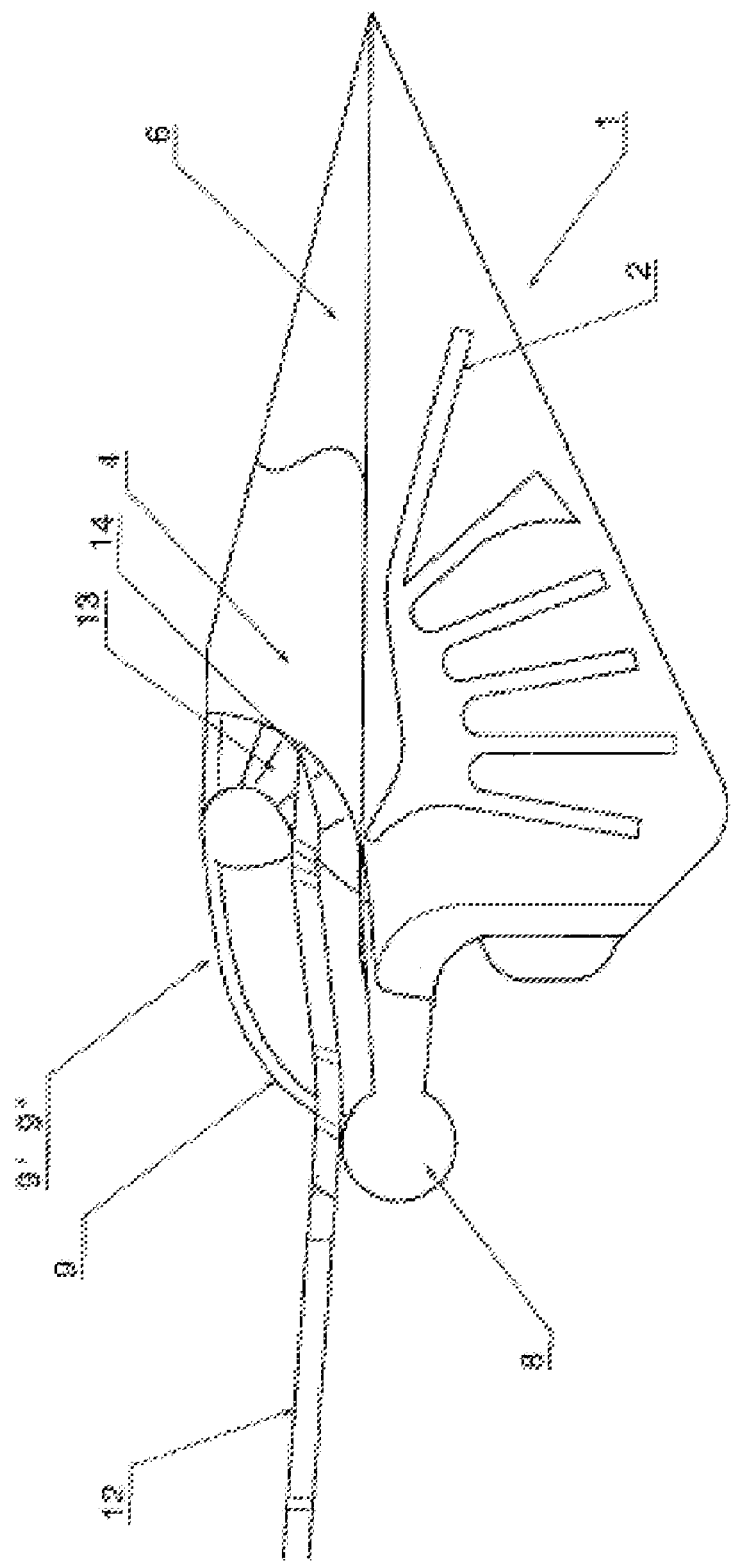
FIG. 3 illustrates schematically the operation of a device for processing the carcass part of a slaughtered poultry in accordance with an exemplary aspect of the invention.

FIG. 3 shows part of a device according to an exemplary aspect of the invention. In particular, FIG. 3 shows the knife 12 that is arranged to cut the legs 9', 9" of the wishbone 9 and disconnect the wishbone 9 from a first membrane and/or ligament 13 that is naturally attached to the wishbone and that is further used in a manner that provides an increased yield of meat that is retained on the carcass part 1. FIG. 3 shows that the knife 12 is shaped in the form of an arrow (see also FIG. 4) and is further provided with a S-shaped contour that is novel in the art. Due to this S-shaped contour, it is possible to simultaneously attain a high yield of meat while avoiding damage to the fillets and also preventing that any remainder of legs (and meat attaching thereto) is left on the so-called wing-knuckle. Such contour further prevents that any bone splinters are caused to remain in the meat of the carcass, specifically in the fillets.

Figure 4:
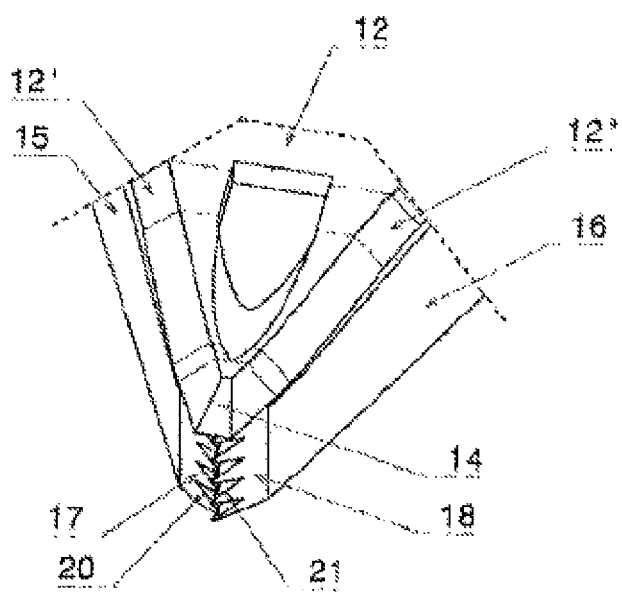
FIG. 4 shows a detailed view of the device of the invention pertaining to its knife and the two blades arranged on opposite sides of the knife.

The knife 12 is provided with cutting side edges 12', 12" (see FIG. 4). When the knife 12 is introduced between the legs 9', 9" of the wishbone 9 and moved up to a position wherein eventually the arrow's point 14 of the knife 12 approaches the part 11 where the legs 9', 9" of the wishbone 9 merge into each other, the cutting side edges 12', 12" of the knife 12 cut the legs 9', 9" of the wishbone 9 at a position immediately adjacent to the wing-joints 8 to which the wishbone 9 connects. The construction of the knife 12 of the device of the invention is thus beneficial to optimize the efficiency of the subsequent harvesting of meat from the carcass part 1 without damaging the inner fillets, and further for avoiding that any bone splinters will remain in said meat after the removal of the wishbone 9 from the carcass part 1.

With reference to FIG. 4, a detailed view is offered to knife 12 clearly showing its arrow shape with an arrow point 14. Furthermore, FIG. 4 shows that two blades 15, 16 are arranged on opposite sides of the knife 12. As a first function, the blades 15, 16 that are arranged on opposite sides of the knife 12 can be used to act as an anvil for the knife 12, when the knife is operated for cutting the legs 9', 9" of the wishbone 9. These blades 15, 16 are preferably further arranged to be independently movable with respect to the knife 12, and are provided with forward edges 17, 18 that are intended for cutting any membrane and/or ligament that connects to the wishbone, in particular the membrane 13 that connects the wishbone to the keelbone, in order to completely release the wishbone 9 from the remainder of the carcass part 1.

In accordance to what is shown in FIG. 4, the forward edges 17, 18 of the blades 15, 16 are provided with forwardly projecting teeth 20, 21. These teeth 20, 21 are very effective for initiating the cutting of any tough membrane and/or ligament 13, particularly the membrane connecting the wishbone to the keelbone. Preferably the teeth 20, 21 of the two blades 15, 16 intermesh when the blades 15, 16 are in a position wherein their cutting edges 17, 18 contact each other. This is entirely clear for the person skilled in the art and thus, a detailed description need not be provided herein.

Figure 5A:
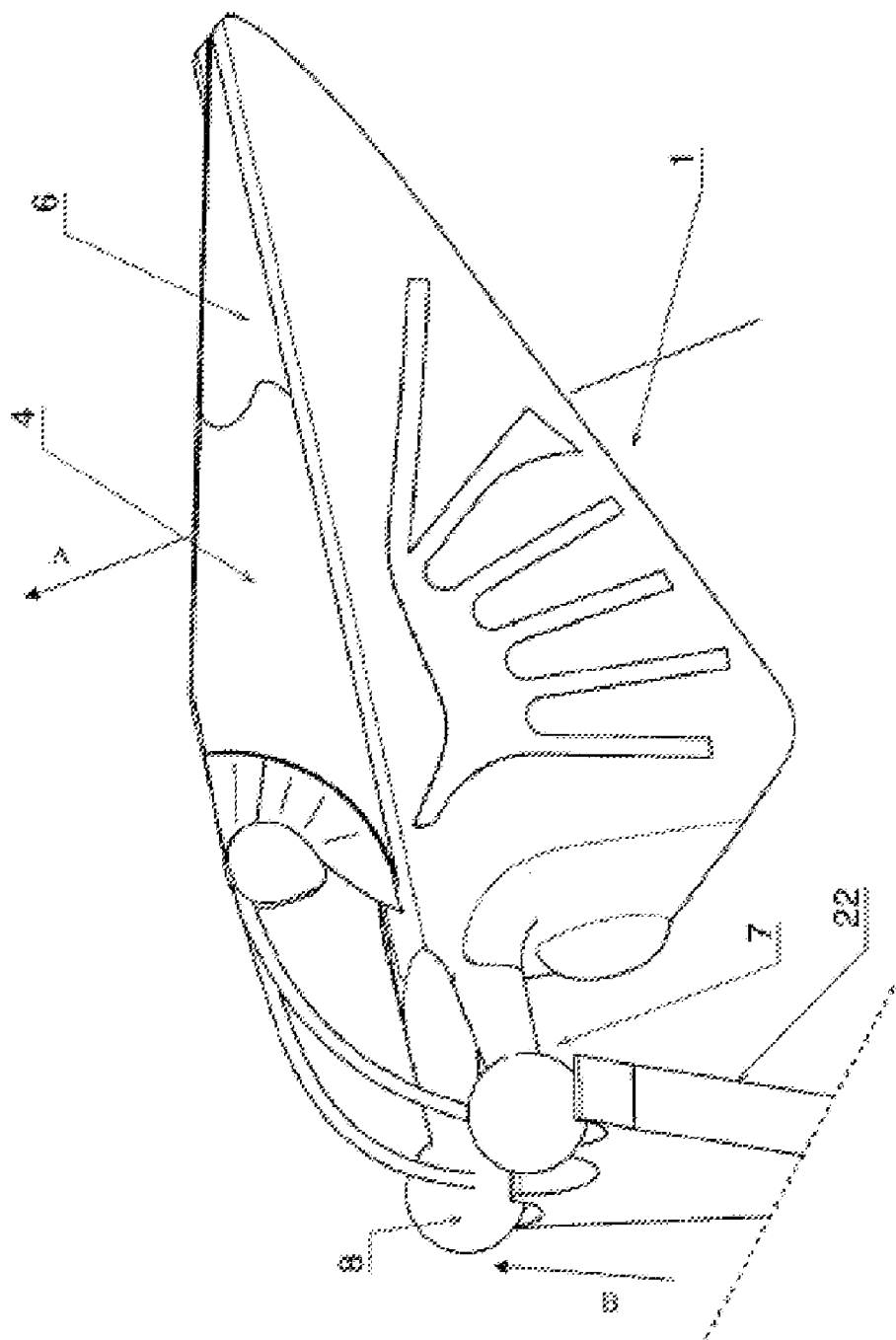
FIGS. 5A and 5B show a side and frontal view of the positioning unit for the coracoids forming part of the device of an exemplary aspect of the invention.
Figure 5B:
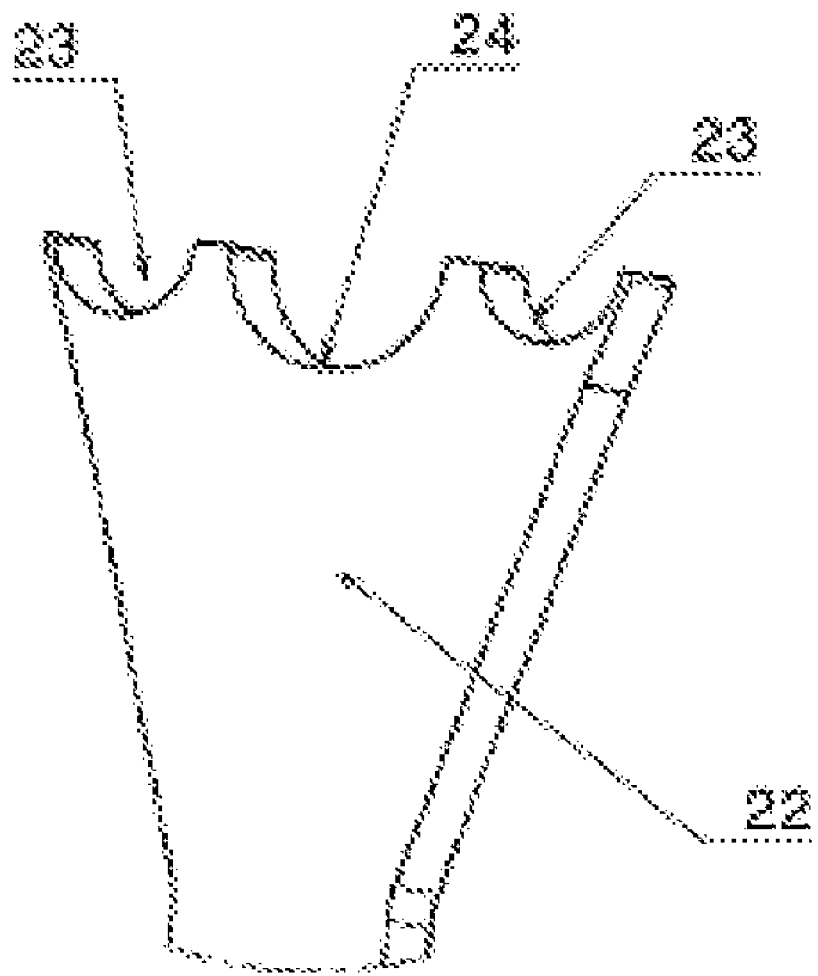

In FIGS. 5A and 5B, a positioning unit 22 for the wing-joints 8 is shown in a side view and frontal view respectively. This positioning unit 22 is arranged as a plate with receptacles 23 that are best shown in FIG. 5B, for receiving therein the coracoids 7 of the carcass part 1 while supporting the coracoids 7. The positioning unit 22 is usable for both breastcaps and fronthalves. In case the fronthalves are processed, the unit 22 has a central receptacle 24 for receiving the poultry's neck therein. FIG. 5A shows that the plate 22 is movable to and from the path (indicated with arrow A) that the carcass part 1 follows in the processing line. The direction of movability of the plate 22 is indicated with the arrow B.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

The invention claimed is:

1. A device for processing a carcass part of slaughtered poultry in a processing line, wherein the carcass part is supported on a carrier that is movable in the processing line, the carcass part having wing-joints, coracoids, a wishbone embodied with two legs that merge into each other at an acute angle, a keelbone, at least one membrana and/or ligament that connects at least to the wishbone, and naturally present meat including inner and outer fillets, the device comprising:
an arrow-shaped knife having two blades arranged on opposite sides of said knife, the blades configured to be independently movable relative to said knife and arranged with forward edges for cutting, wherein the forward edges of the two blades are provided with forwardly projecting teeth.

2. A device for processing a carcass part of slaughtered poultry as in claim 1, wherein the forwardly projecting teeth intermesh when the blades are in a position such that their forward edges contact each other.

3. A device for processing a carcass part of slaughtered poultry as in claim 1, wherein said knife is arranged with cutting side-edges and shaped with an S-shaped contour so that when the knife is introduced between the legs of the wishbone up to a position wherein the arrow's point of the knife approaches the part where the legs of the wishbone merge into each other, the cutting side-edges of the knife are arranged to cut the legs of the wishbone at a position immediately adjacent to the wing-joints to which the wishbone connects.

4. A device for processing a carcass part of slaughtered poultry as in claim 1, further comprising a positioning unit for the wing joints, wherein the positioning unit is arranged as a plate with receptacles for receiving therein the coracoids of the carcass-part while supporting the coracoids.

5. A device for processing a carcass part of slaughtered poultry as in claim 4, wherein the plate is movable to and from the path that the carcass-part follows in the processing line.

* * * * *